United States Patent
Wang et al.

(10) Patent No.: US 8,325,472 B2
(45) Date of Patent: Dec. 4, 2012

(54) ELECTRONIC APPARATUS HAVING AUXILIARY LIGHTING FOR ILLUMINATION

(75) Inventors: Yen-Chun Wang, Miao-Li Hsien (TW);
An-Chi Wei, Miao-Li Hsien (TW);
Hong-Bin Yang, Miao-Li Hsien (TW);
Ming-Young Shiao, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 232 days.

(21) Appl. No.: 12/815,412

(22) Filed: Jun. 15, 2010

(65) Prior Publication Data

US 2011/0261522 A1    Oct. 27, 2011

(30) Foreign Application Priority Data

Apr. 22, 2010    (TW) ................................ 99112619 A

(51) Int. Cl.
*G06F 1/16* (2006.01)
(52) U.S. Cl. ......... 361/679.27; 361/679.02; 361/679.26; 361/679.55; 312/223.1; 312/223.2; 362/253; 362/322

(58) Field of Classification Search .............. 361/679.27
See application file for complete search history.

(56) References Cited

U.S. PATENT DOCUMENTS

| | | | | |
|---|---|---|---|---|
| 6,118,653 A | * | 9/2000 | Kim | 361/679.23 |
| 6,161,944 A | * | 12/2000 | Leman | 362/276 |
| 6,487,069 B1 | * | 11/2002 | Onodera | 361/679.09 |
| 7,570,485 B2 | * | 8/2009 | Krah | 361/679.23 |
| 7,641,362 B2 | * | 1/2010 | Ryder et al. | 362/253 |
| 7,672,594 B2 | * | 3/2010 | Mui et al. | 398/142 |
| 7,903,171 B2 | * | 3/2011 | Takabatake et al. | 348/376 |
| 2003/0227771 A1 | * | 12/2003 | Hunter | 362/85 |
| 2007/0253182 A1 | * | 11/2007 | Motai et al. | 362/23 |
| 2008/0151099 A1 | * | 6/2008 | Lin et al. | 348/376 |
| 2011/0116223 A1 | * | 5/2011 | Lev et al. | 361/679.27 |

* cited by examiner

*Primary Examiner* — Anthony Q Edwards
(74) *Attorney, Agent, or Firm* — Altis Law Group, Inc.

(57) ABSTRACT

An electronic apparatus includes a mainframe with a keyboard embedded therein, a mounting frame pivotally connected with the mainframe, a display screen mounted in the mounting frame, a lighting source disposed on the mounting frame, and an optical element cooperating with the lighting source and slideably mounted on the mounting frame. Light from the lighting source is projected to different predetermined areas by adjusting positions of the optical element relative to the lighting source. In each of the positions of the optical element, the light from the lighting source is modulated by a corresponding portion of the optical element to be projected to a corresponding predetermined area.

6 Claims, 8 Drawing Sheets

ELECTRONIC APPARATUS HAVING AUXILIARY LIGHTING FOR ILLUMINATION

BACKGROUND

1. Technical Field

The disclosure relates to an electronic apparatus, and particularly to an electronic apparatus having a keyboard and an auxiliary lighting which can illuminate the keyboard or a desired object when required.

2. Description of Related Art

A conventional electronic apparatus such as a notebook computer commonly includes a display screen, a frame receiving the display screen therein, and a keyboard. A solid state lighting source such as an LED (light-emitting diode) is disposed on the frame adjacent to the display screen. The solid state lighting source can help user get a clear picture of a user's face when the user has a video chat with others. When daylight around the electronic apparatus is dim, the solid state lighting source can illuminate the keyboard to facilitate the user to use. However, light from the solid state lighting source can only be irradiated toward a certain direction and the illumination range thereof is very limited.

What is needed, therefore, is an electronic apparatus which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
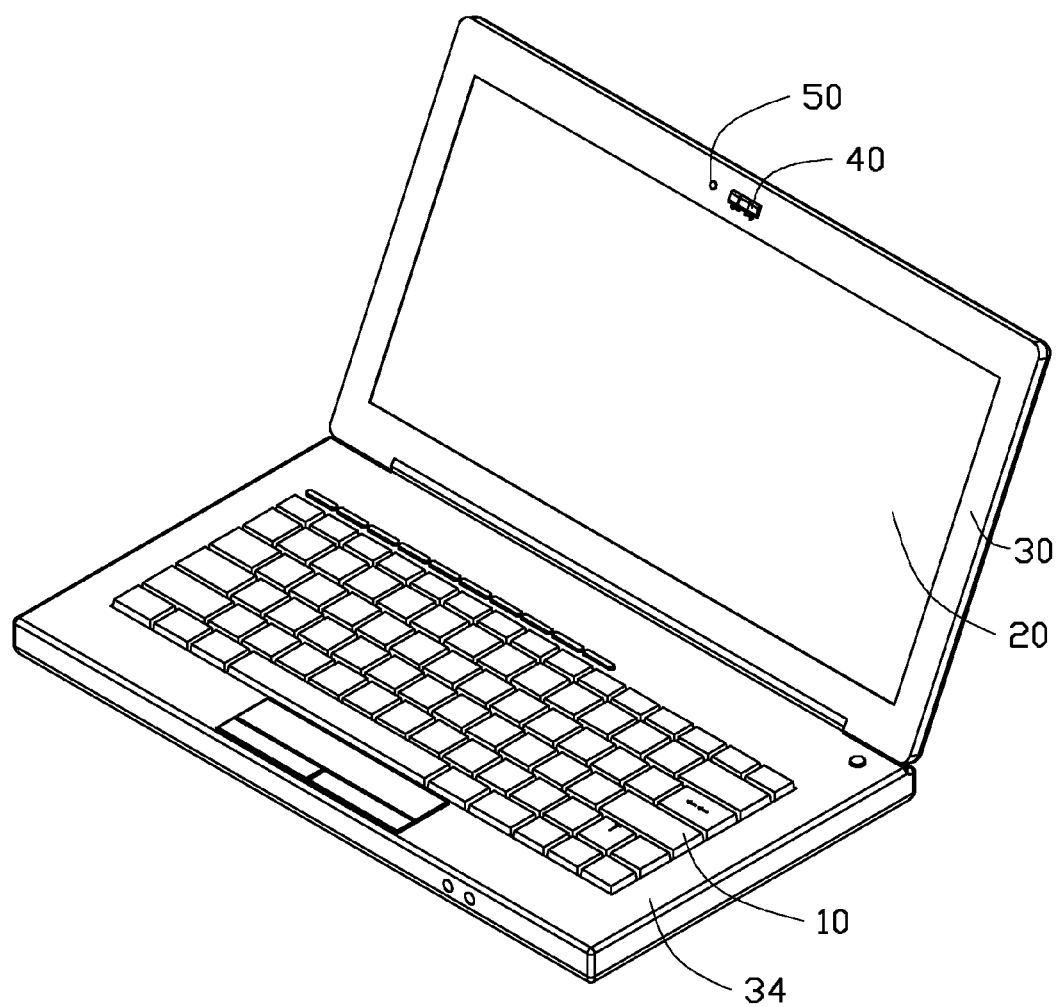
FIG. 1 is an isometric, assembled view of an electronic apparatus in accordance with one embodiment of the disclosure.

Referring to FIG. 1, an electronic apparatus in accordance with an embodiment of the disclosure includes a mainframe 34 in which a keyboard 10 is received and a display instrument pivotedly connecting the mainframe 34. The display instrument includes a display screen 20, a mounting frame 30 receiving the display screen 20 therein and an illumination module 40 disposed on the mounting frame 30. The illumination module 40 is located at a middle of a top of the mounting frame 30 adjacent to a middle of a top of the display screen 20. In this embodiment, the electronic apparatus is a notebook computer. It is understandable that the electronic apparatus can also be a PDA, a mobile phone, or any other electronic device having a keyboard and a display pivotedly connected to the keyboard.

Figure 2:
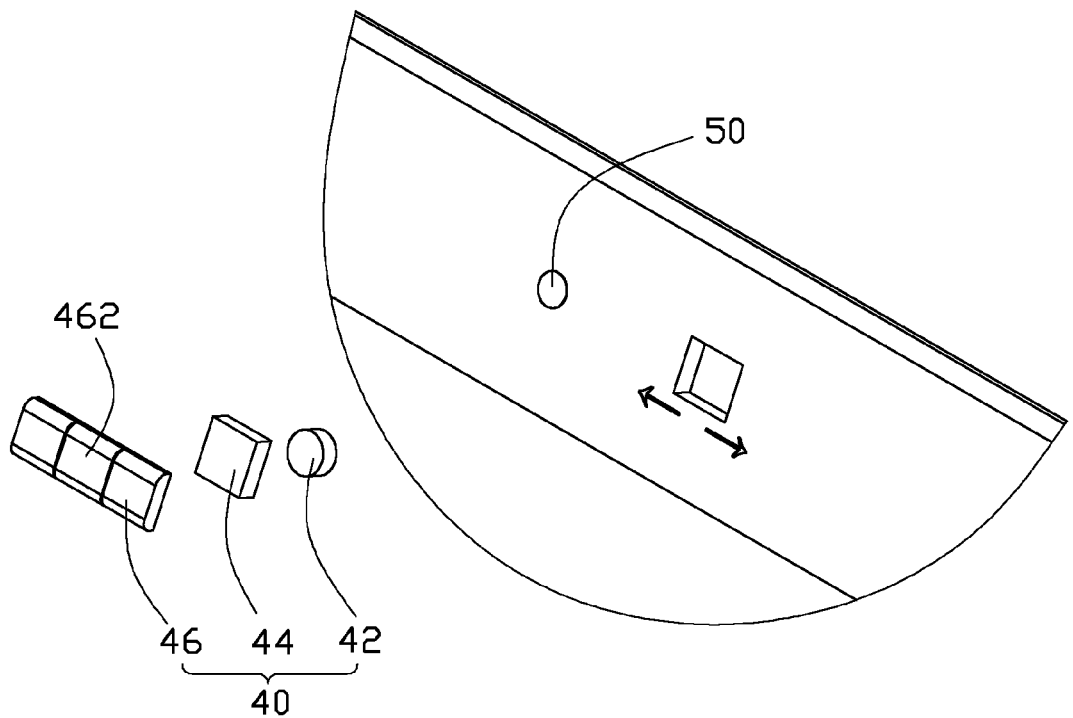
FIG. 2 is a partly exploded view of the electronic apparatus of FIG. 1.

Also referring to FIG. 2, the illumination module 40 includes a solid state lighting source 42, a transparent cover 44 covering the solid state lighting source 42, and an optical element 46 cooperating with the solid state lighting source 42. A web camera 50 is disposed on the mounting frame 30 adjacent to the solid state lighting source 42. In this embodiment, the solid state lighting source 42 is an LED light source 42. The optical element 46 is slideably mounted on the mounting frame 30 and located in front of the LED light source 42. The optical element 46 includes three interconnected optical lenses 462. Each optical lens 462 has a curvature different from that of the others for adjusting light pattern/distribution generated by the LED light source 42 to radiate out from the illumination module 40. The optical element 46 can slide rightward or leftward relative to the LED light source 42 to make a corresponding optical lens 462 in alignment with the LED light source 42 according to requirements.

Figure 3:
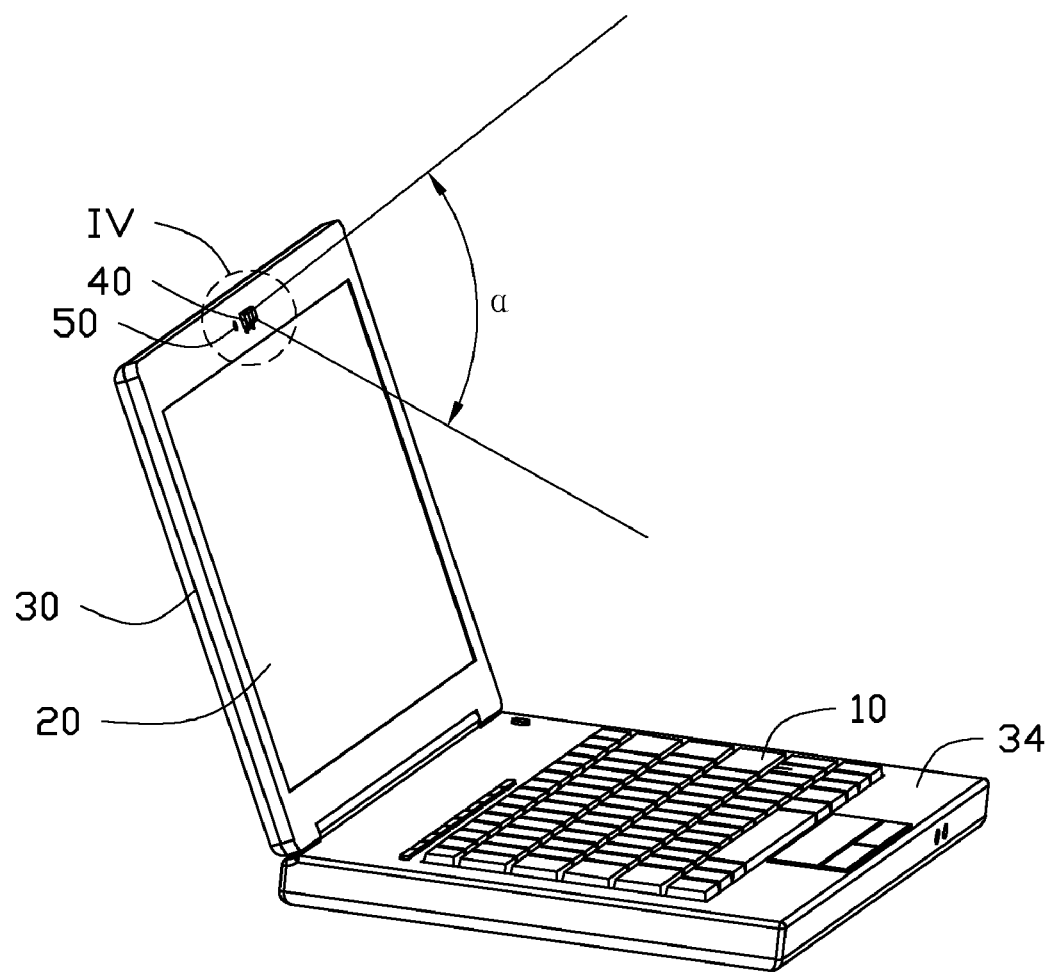
FIG. 3 is an isometric view showing a use of the electronic apparatus of FIG. 1, in which an optical element is caused to slide to a first position relative to an LED light source.
Figure 4:
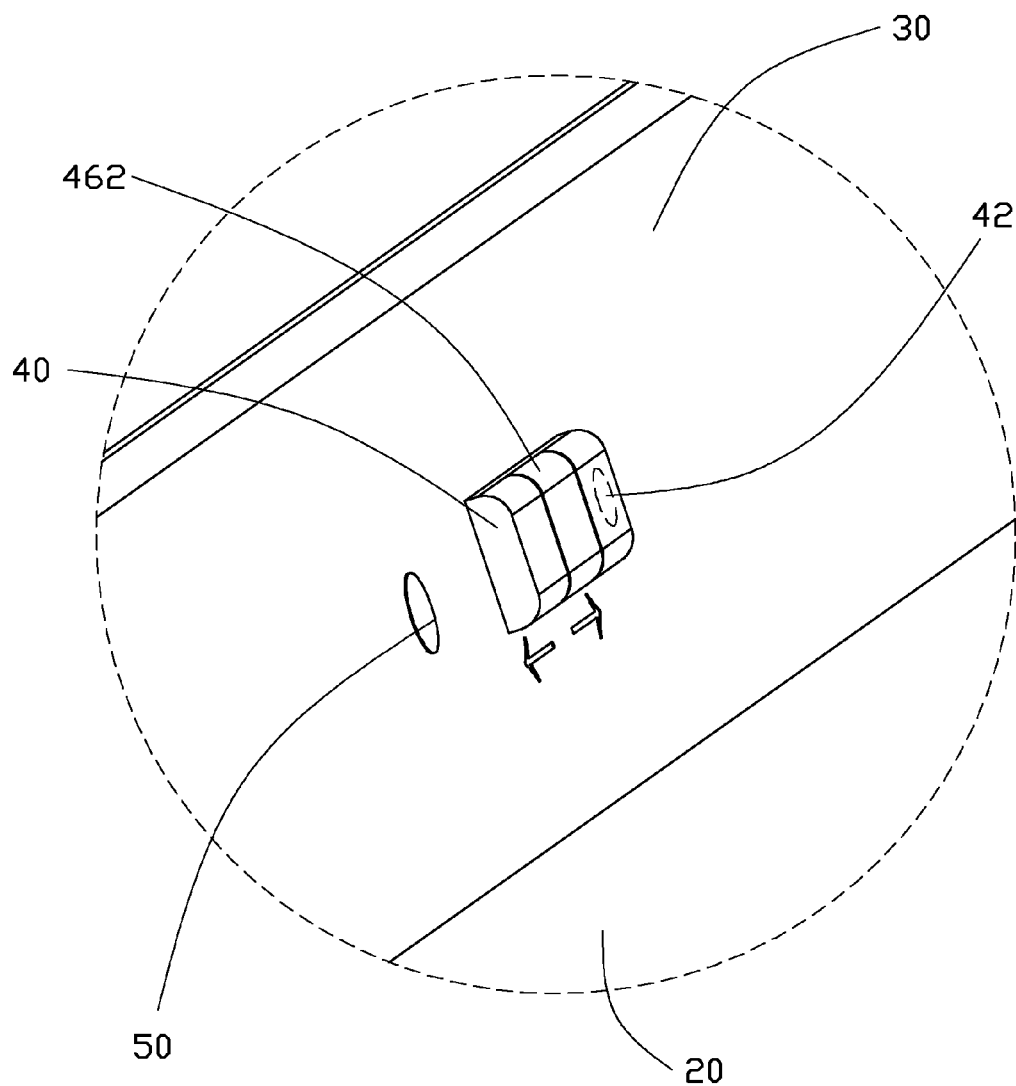
FIG. 4 is an enlarged view of a portion IV of the electronic apparatus of FIG. 3.

Also referring to FIGS. 3-4, when a user uses the electronic apparatus, an angle of the display instrument relative to the mainframe 34 is adjusted to a suitable angle which generally varies from 90° to 120°. When the optical element 46 is caused to slide to a first position relative to the LED light source 42 to make a rightmost optical lens 462 in alignment with the LED light source 42, light from the LED light source 42 extends through the rightmost optical lens 462 and is modulated into a beam with an illumination range $\alpha$, and the beam is projected on a first predetermined area (i.e. an area in front of the display screen 20). Thus, others can get a clear picture of the user's face via the web camera 50 when the user has a video chat with others.

Figure 5:
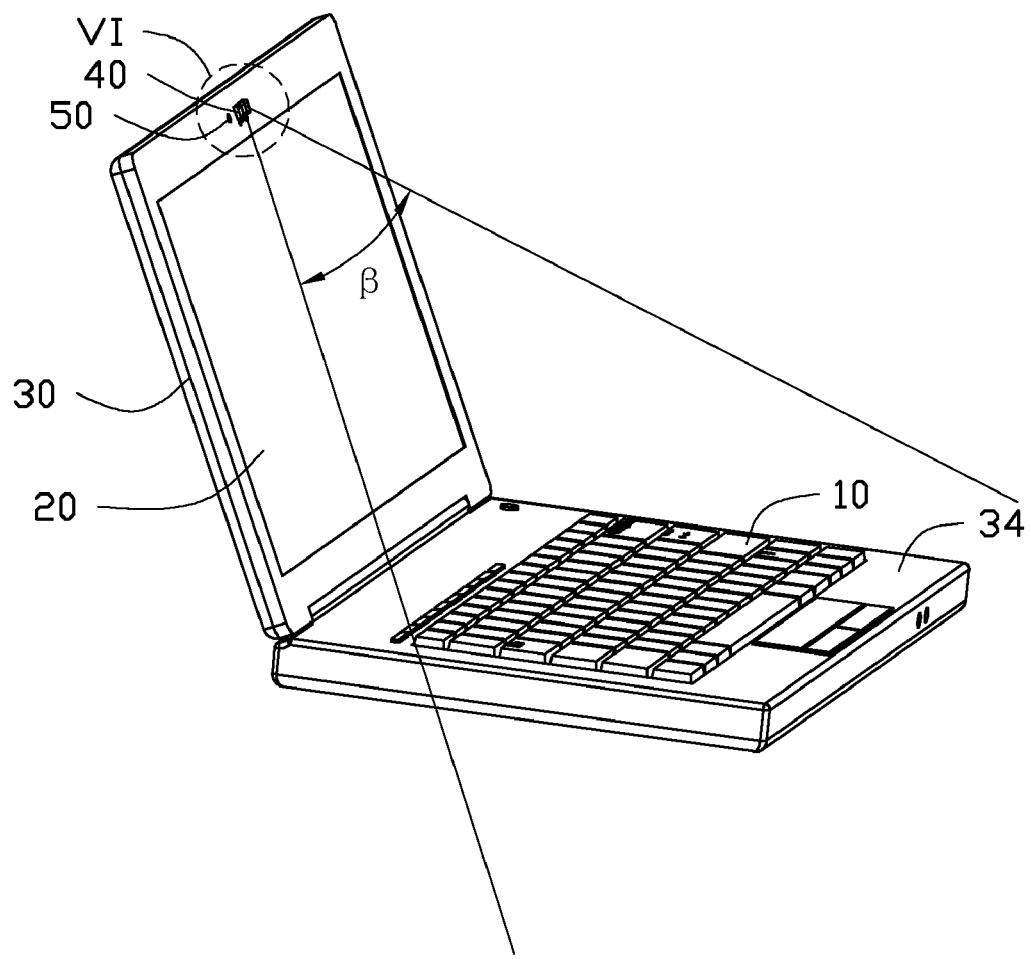
FIG. 5 is a view similar to FIG. 3, in which the optical element is caused to slide to a second position relative to the LED light source.
Figure 6:
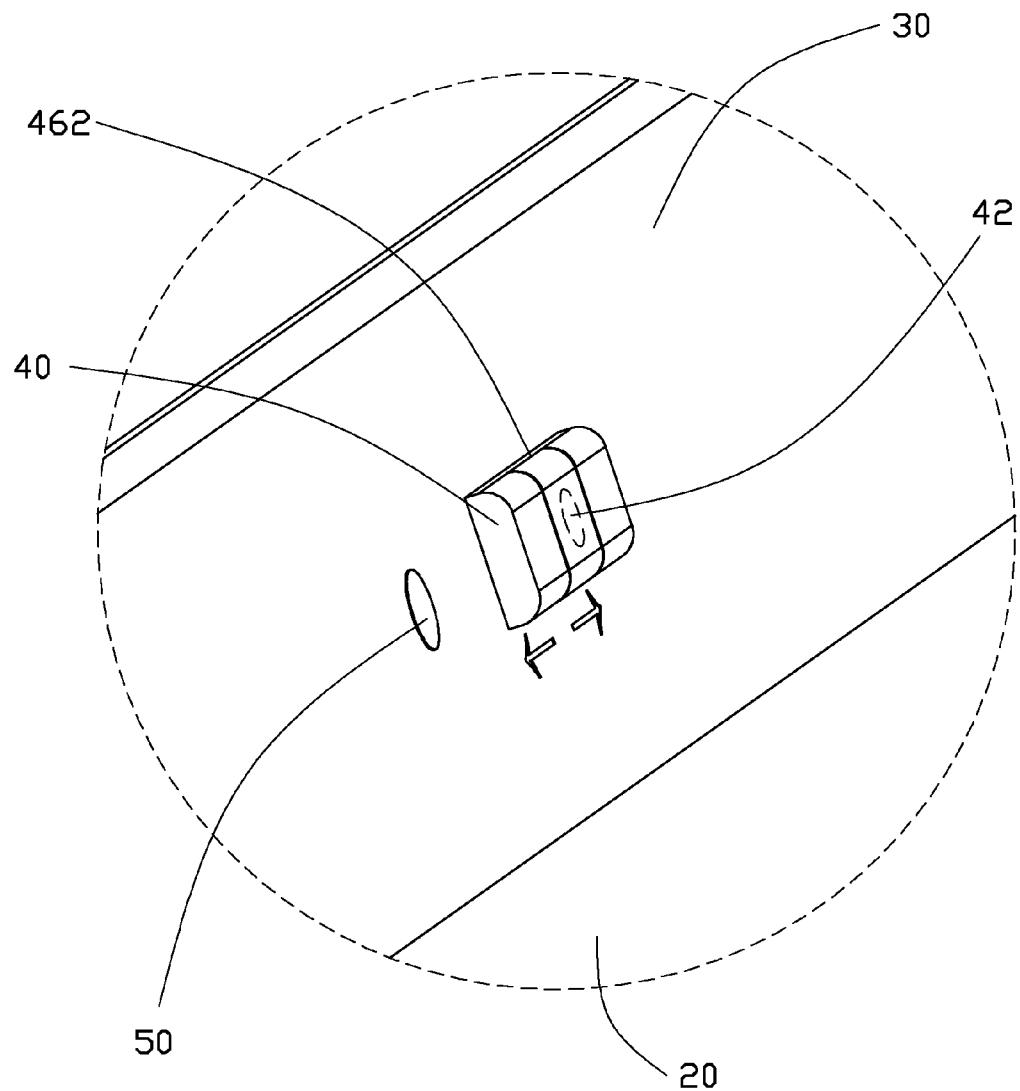
FIG. 6 is an enlarged view of a portion VI of the electronic apparatus of FIG. 5.

Also referring to FIGS. 5-6, when the optical element 46 is caused to slide to a second position relative to the LED light source 42 to make a middle optical lens 462 in alignment with the LED light source 42, light from the LED light source 42 extends through the middle optical lens 462 and is modulated into a beam with an illumination range $\beta$, and the beam is projected on a second predetermined area (i.e. an area where the keyboard 10 is located). Thus, the user can see the keyboard 10 clearly.

Figure 7:
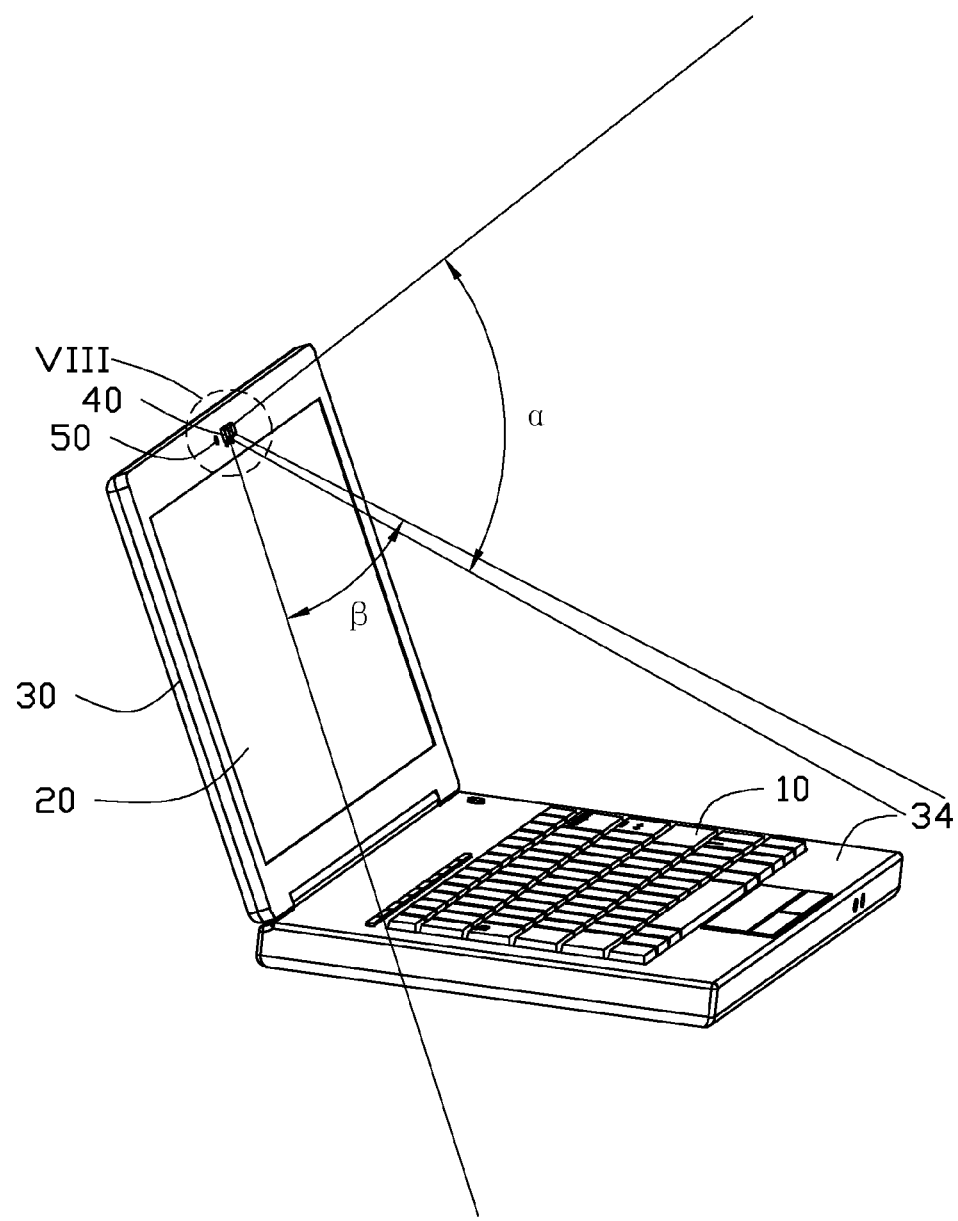
FIG. 7 is a view similar to FIG. 3, in which the optical element is caused to slide to a third position relative to the LED light source.
Figure 8:
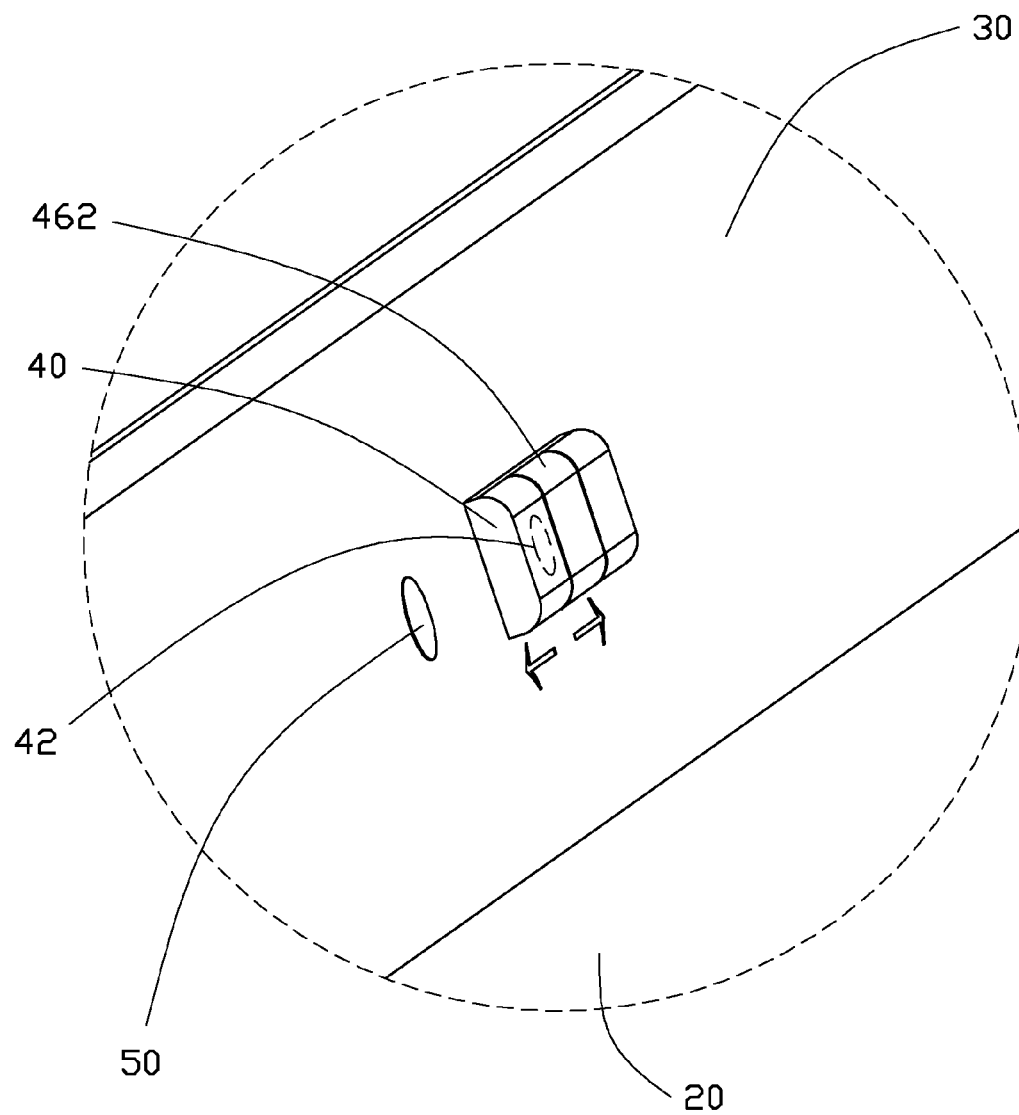
FIG. 8 is an enlarged view of a portion VIII of the electronic apparatus of FIG. 7.

Also referring to FIGS. 7-8, when the optical element 46 is caused to slide to a third position relative to the LED light source 42 to make a leftmost optical lens 462 in alignment with the LED light source 42, light from the LED light source 42 extends through the leftmost optical lens 462 and is modulated into a beam with an illumination range $\alpha+\beta$, and the beam is projected on both the first predetermined area in front of the display screen 20 and the second predetermined area where the keyboard 10 is located. Thus, not only can the user see the keyboard 10 clearly, but also can others get a clear picture of the user's face via the web camera 50 when the user has a video chat with others.

According to the disclosure, the optical element 46 cooperating with the solid state lighting source is slideably mounted on the frame mounting 30 of the electronic apparatus; light from the solid state lighting source can be modulated into beams with different illumination ranges by adjusting the positions of the optical element 46 relative to the solid state lighting source 42; thus, the user can use the electronic apparatus more conveniently.

It is believed that the disclosure and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic apparatus, comprising:
   a mainframe with a keyboard embedded therein;
   a display screen;
   a mounting frame pivotally connected with the mainframe with the display screen mounted in the mounting frame;
   a lighting source disposed on the mounting frame; and
   an optical element cooperating with the lighting source and slideably mounted on the mounting frame, light from the lighting source being projected to different predetermined areas by adjusting positions of the optical element relative to the lighting source, wherein in each of the positions of the optical element, the light from the lighting source is modulated by a corresponding portion of the optical element to be projected to a corresponding predetermined area;
   wherein the lighting source is an LED light source, and the optical element covers the LED light source and comprises a plurality of interconnected optical lenses, when the optical element is caused to slide to a predetermined position relative to the LED light source to make a predetermined optical lens in alignment with the LED light source, the light from the LED light source extends through the predetermined optical lens and is modulated into a beam with a certain illumination range; and
   wherein the optical element comprises a first optical lens and a second optical lens, when the optical element is caused to slide to a first position relative to the LED light source, the light from the LED light source extends through the first optical lens and is projected on a first predetermined area in front of the display screen, and when the optical element is caused to slide to a second position relative to the LED light source, the light from the LED light source extends through the second optical lens and is projected on a second predetermined area where the keyboard is located.

2. The electronic apparatus as claimed in claim 1, wherein the optical element further comprises a third optical lens, when the optical element is caused to slide to a third position relative to the LED light source, light from the LED light source extends through the third optical lens and is projected on both the first predetermined area in front of the display screen and the second predetermined area where the keyboard is located.

3. The electronic apparatus as claimed in claim 1 further comprising a web camera disposed on the mounting frame adjacent to the light source.

4. The electronic apparatus as claimed in claim 1, wherein the optical element and the lighting source are located near a middle of a top of the display screen.

5. The electronic apparatus as claimed in claim 4, wherein the optical element and the lighting source are located at a middle of a top of the mounting frame.

6. The electronic apparatus as claimed in claim 1, wherein the electronic apparatus is one of a notebook computer, a PDA and a mobile phone.

* * * * *